United States Patent [19]
Givens et al.

[11] 3,757,825
[45] Sept. 11, 1973

[54] PRESSURE EQUALIZING DEVICE FOR FLUID PRESSURE SYSTEMS

[76] Inventors: Reuben H. Givens, 61 Canal St., Apt. 20, San Rafael, Calif. 94901;
Theodore P. Spero, 362 Via Casitas, Greenbrae, Calif. 94904

[22] Filed: July 21, 1971

[21] Appl. No.: 164,733

[52] U.S. Cl. .................. 138/26, 137/593, 303/87
[51] Int. Cl. .............................................. F16l 55/04
[58] Field of Search ................... 137/593; 138/26, 138/30; 188/352; 303/87

[56] References Cited
UNITED STATES PATENTS

| | | | |
|---|---|---|---|
| 1,974,323 | 9/1934 | Allen | 138/30 |
| 2,941,549 | 6/1960 | Mard | 138/30 |
| 3,430,660 | 3/1969 | Mitton | 303/87 X |
| 2,405,614 | 8/1946 | Shriro | 138/30 X |

FOREIGN PATENTS OR APPLICATIONS

| | | | |
|---|---|---|---|
| 1,373,140 | 8/1964 | France | 303/87 |

*Primary Examiner*—Alan Cohan
*Assistant Examiner*—Gerald A. Michalsky
*Attorney*—Owen, Wickersham & Erickson

[57] ABSTRACT

A shock absorbing and pressure equalizing device for hydraulic actuating systems comprises an elongated housing with threaded openings to facilitate its connection to a hydraulic line between a power source and a pair of actuators. The openings communicate with a fluid receiving chamber within the housing, one side of which is the end face of a shock absorbing, resiliently yieldable member that extends axially into but does not fill a cavity formed by one end of the housing. Shock waves of increased pressure within the first chamber produced by an imbalanced reaction from one of the system actuators are absorbed by a crushing action against the end face of the resiliently, yieldable member which can deform temporarily into the housing cavity. A graphite powder coating is provided on the yieldable member to prevent it from sticking to the inner walls of the cavity.

4 Claims, 4 Drawing Figures

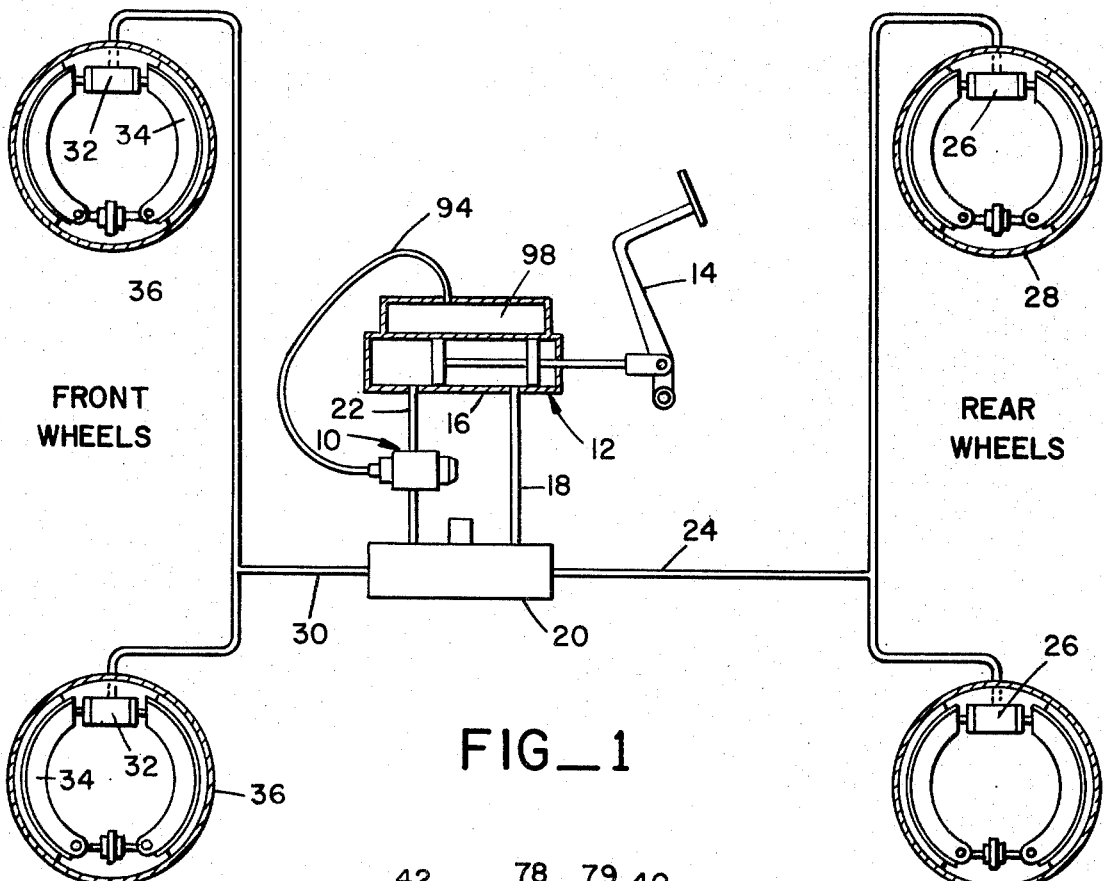
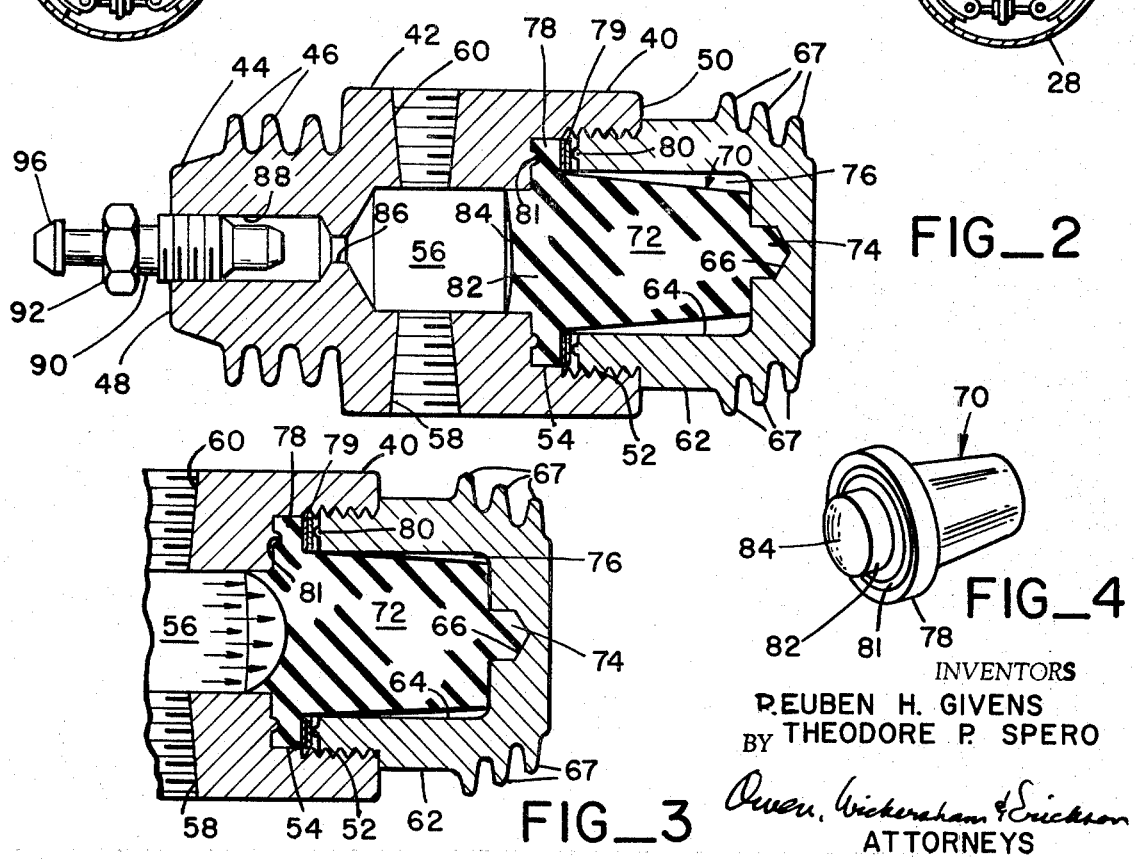

PRESSURE EQUALIZING DEVICE FOR FLUID PRESSURE SYSTEMS

This invention relates to systems actuated by fluid pressure and more particularly to an improved device for equalizing pressure variations or shock waves produced by one of a pair of actuators that is supplied with fluid under pressure from a single power source.

In many such fluid pressure systems the operation of one of the actuators will be interrupted by a resistance factor which will either stop or delay its function while the other actuator proceeds to operate normally. This can cause erratic or uneven operation of the apparatus or in some cases a complete malfunctioning. For example, in automobile braking systems using drum type brakes, each drum is actually an imperfect "out-of-round" circle and has a so-called "high spot." When the brakes are applied the brake shoes pass over the high spot until the drum ultimately stops with the brake shoe at the high spot. Since the location and degree of the high spots on any given pair of brake drums must be inherently different, the brake shoes on one wheel drum, when applied with unusual force as in emergency situations, will tend to "lock-up" before the other wheel, thereby causing the automobile to swerve dangerously or skid to one side. As this "lock-up" is about to occur a shock wave of increased pressure reverberates along the hydraulic lines in the brake system, but if the shock wave and its overpressure can be absorbed or eliminated or equalized with the other wheel, the lock-up will not occur, and the dangerous results therefrom can be avoided.

Similar problems occur in various other hydraulic systems wherein an imbalance of forces created between two actuators supplied from the same pressure source can tend to produce an excessive pressure feedback at different times because of their slightly different characteristics.

A previous attempt to solve the problem of overcoming the effects of unequal resistance forces and shock factors in hydraulic brake systems was embodied in U.S. Pat. No. 3,430,660. However, the performance and efficiency of the device described in the aforesaid patent proved to be substantially limited. For example, it utilized a hollow bulb member having a central recess open at one end with the bulb being retained in a cavity with bulging sidewalls. Access to the recess of this bulb member was through a relatively small orifice, so that air tended to get trapped within the bulb recess, thereby causing it to react sluggishly. Also, the patented device had no means for dissipating heat and this further limited its operating efficiency, particularly when it became necessary to mount the device near heat producing components.

One object of the present invention is to provide an improved pressure equalizing and shock absorbing device for fluid pressure systems that provides improved operating efficiency and solves the aforesaid problems of prior art devices.

A more specific object of the present invention is to provide a hydraulic pressure equalizing device utilizing an elongated, solid but resiliently yieldable member that when placed in a hydraulic line extending from a pressure source which is common to two actuators will readily absorb feedback pressure surges or shock waves from one of the actuators so that the pressure at one of the actuators cannot build up to the point where it locks before the other actuator.

Another object of the present invention is to provide a hydraulic pressure equalizing device that will not allow air bubbles to be trapped within its operating elements and will therefore provide a faster more positive response in damping out the effects of shock waves and over-pressure pulsations in hydraulic systems.

Another object of the present invention is to provide a hydraulic pressure equalizing device that is particularly well adapted for ease and economy of manufacture.

Another object of the present invention is to provide a hydraulic pressure equalizing device that will dissipate heat and can be installed in a wide variety of locations even near high heat producing components without affecting its operative efficiency.

Another object of the present invention is to provide a hydraulic pressure equalizing device that provides a means for bleeding a brake system to remove air and allows a person to observe when air is totally removed.

The foregoing objectives are accomplished by a device that is connected in a fluid pressure system at some convenient location between the source of fluid pressure and a pair of actuators whose pressure must be equalized to provide smooth, safe operation of the apparatus. Generally, it includes a housing that forms a chamber at one end within which is seated a solid but resiliently yieldable shock absorber member. This member is held firmly in place by a collar near its head end while its lower portion below the collar extends into an enlarged cavity of the housing that provides an air space surrounding the lower portion. At its head end above the collar, the shock absorber has a circular end surface that forms one wall of a fluid receiving chamber within the housing. On opposite sides of this circular end surface are threaded openings to facilitate connection of the device in a hydraulic pressure line. Directly opposite from the end surface is a normally closed valve that can be opened manually to bleed air from the brake system. When installed in a hydraulic brake system, the entire end face of the solid shock absorber member is directly in contact with the hydraulic fluid under pressure. When the brakes are applied normally, pulsations created in the brake hydraulic lines by the "out of round" drums are damped out by the resiliency of the solid shock absorber member. As the pulsations create increased pressure and shock waves, the fluid within the upper chamber of the device produces a unique piston or crushing action against the end surface of the shock absorber. Consequently, it absorbs these shocks by resiliently expanding around its lower end into the extra space provided at the lower end of the housing.

Other objects, advantages and features of my invention will become apparant from the following detailed description taken in conjunction with the drawings, in which:

FIG. 1 is a schematic diagram of a typical braking system utilizing a pressure equalizing device embodying the principles of our invention;

FIG. 2 is an enlarged view in elevation and in cross section of our pressure equalizing device;

FIG. 3 is a fragmentary view in section similar to FIG. 2 which illustrates the crushing action of the resilient shock absorbing member of our device; and FIG. 4 is a view in perspective showing the shock absorbing device removed from its housing.

With reference to the drawing, FIG. 1 shows schematically a typical automobile brake system utilizing a pressure equalizing or shock absorbing device 10 according to the present invention. In the system shown, a central hydraulic power source 12 such as the master brake assembly of an automobile brake system is operated by a foot pedal 14 and has a double piston cylinder 16 that operates to control the front and rear wheel brakes. The rear cylinder has an output line 18 that extends directly to a check valve 20 and the front cylinder has a similar output line 22 that extends to the shock absorbing device 10 and from the device 10 to the check valve 20. A line 24 extends from the check valve and branches to actuators 26 on each of the two rear wheel brake drums 28. A separate line 30 extends from the check valve 20 and branches to a pair of actuators 32 that are connected to brake shoes 34 on the front wheel drums 36. The purpose of the check valve 20 which is shown merely to depict a modern automobile brake system, is to prevent the loss of hydraulic pressure for both front and rear brakes if a leak should occur in either the front or rear lines 30 or 24.

Although a brake system for all four wheels is shown for illustrative purposes, our equalizing device 10 is normally operative for only that part of the system which includes the two front wheels. This is because in hard braking situations a large percentage of the car's weight shifts to the front wheels, and the rear wheels merely provide a dragging force that has only a minor influence on directional control. However, the front wheels cannot for one instant "lock-up" at different times or brake unevenly, because to do so causes an immediate loss of directional control. The check valve and the brake actuators are not shown in detail since they may be standard components. In the typical system illustrated in FIG. 1, it is important to note that hydraulic fluid completely fills the front line from the front brake actuators through the check valve 20 and through the equalizing device to the master cylinder 16. Thus, in normal use, the hydraulic lines 18, 22, 24 and 30 are full of fluid and pressure waves or shock waves are transmitted along them rapidly from the actuators to the master cylinder and consequently through the device 10.

Turning now to FIG. 2, the pressure equalizing and shock absorbing device 10 as shown comprises a main housing 40 which is made of a rigid durable material, preferably metal. This housing is generally cylindrical but preferably has an exterior hexagonal portion 42 between its ends and axially adjacent the hexagonal portion is a smaller integral portion 44 having a series of spaced apart relatively thin fin members 46. These fin members serve to dissipate heat that is generated within the device 10 or absorbed by it when installed near other heat producing components. From the outermost fin member the housing tapers to a smaller diameter at a transverse end face 48. At its opposite end 50, the main housing 40 has a relatively large bore 52 with internal threads. This bore terminates at an internal annual shoulder 54 forming a cylindrical fluid receiving chamber 56 that extends axially within the main housing. Extending radially inwardly into this chamber from opposite sides of the hexagonal portion are a pair of ports 58 and 60, each of which is preferably provided with pipe threads. This makes it possible for the tubular hydraulic lines 22 to be readily connected to the device without requiring any fitting, tube or the like, to extend within and utilize space within the chamber 56.

Threadedly secured in the bore 52 of the main housing 40 is a cup-like member 62 having a generally cylindrical cavity 64. A smaller recess 66 concentric with the cavity 64 is provided at its closed end. This cup-like member has an external hex nut body portion with adjacent external threads extending axially therefrom which fit the bore 52 of the main housing. On the otherside of the hex nut body portion this member 62 tapers to its outer end and has a series of coding fins 67, similar to the fins 46. The member 62 surrounds and holds in place a solid but resiliently yieldable member 70 that provides the shock absorbing and pressure equalizing functions of our device 10 in a unique and efficient manner. This yieldable shock absorbing member 70 is preferably molded from a rubber-like elastomeric material such as neoprene having a hardness of around 80 "Shores." Generally, it has a frustoconical body 72 with an integral knob-like projection 74 at its small end that fits within the smaller recess 66 and helps maintain the member 70 in a centrally oriented position within the cavity 64. This assures that a uniform amount of space 76 will surround the frusto-conical body portion 72 of the member 70. Near its larger end the yieldable shock-absorbing member has a radially extending circular collar 78 having a substantially uniform thickness. This collar has a diameter that is only slightly less than the diameter of the internal shoulder 54 and it is held against this shoulder 54 of the housing when the end cap is threaded in place. A pair of annular metal (e.g. brass) washers 79 are provided adjacent the side of the collar 78 and these washers are engaged by an annular ridge formed around the rim 80 of the cup-like member 62. This arrangement prevents any damage to the yieldable member 70 when it is installed and the cup-like member 62 is threaded tightly against the collar to prevent any leakage of fluid from the chamber 56. A concentric groove 81 is preferably provided on the upper surface of the collar and a mating annular ridge on the shoulder 54 fits therein to further assure a fluid tight seal around the member 70. Extending axially beyond the collar a short distance is an integral cylindrical portion 82 of the shock-absorber member 70 which fits snugly within the end of the chamber 56. The end face 84 of this small cylindrical portion preferably has a slight concavity and forms a yieldable end wall of the chamber 56.

At the other end of the central chamber is a passage 86 connected to another threaded bore 88 having a somewhat larger diameter. Seated within this latter bore is an adjustable rotatable valve member 90 of the well-known type. Normally, this valve is locked in the closed position, but by loosening an external nut 92 it can be rotated to an open position. In this open position one end of a piece of clear plastic tubing 94 (as shown schematically in FIG. 1) can be readily attached to a conical end portion 96 on the valve member 90. The other end of the tubing can be placed in the reservoir 98 of the master cylinder. Any air bubbles trapped in the brake system can then be forced into the device 10 and then bled out of it through the valve 90. These bubbles can then be observed in the tubing as they are removed from the system and the bleeding process can be continued until only hydraulic fluid is flowing back to the reservoir.

When the device 10 is installed in a brake system as shown in FIG. 1, the resiliently yieldable member 70 within it operates efficiently to absorb shock and equalize pressure surges. With all air properly removed from the system, the central chamber 56 is unobstructed and completely filled with hydraulic fluid. When a shock wave or pressure surge is transmitted through the fluid as when a brake shoe 34 passes over the "high spot" of its adjacent drum 36, the pressure within the chamber 56 as indicated by the arrows in FIG. 3, acts uniformly against the concave end surface 84. Thus, a crush-like force is produced axially on the member 70 and in response to this force its body portion 72 can bulge outwardly near its smaller end into the surrounding space 76. The surface of the body portion 72 is preferably coated with a layer of fine graphite powder to prevent it from sticking to the inner walls of the cavity 64. The fact that the member is solid and that the force is applied to a substantial area at one end while its other end is held in place causes the member to be sensitive and to react rapidly and positively to all pressure changes. Thus, in use, a smooth even braking action is assured on both front wheels even when the brakes are applied with normally excessive force at a relatively high speed. Moreover, no "lock-up" of one front wheel brake can occur because when a significant pressure rise or shock in the hydraulic fluid starts to take place, the yieldable member 70 immediately relieves or absorbs the pressure or shock and prevents the utlimate lock-up pressure level from being reached.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. For use in a fluid pressure system including a central power source and a pair of actuators interconnected by a fluid pressure conduit, a pressure equalizing and shock-absorbing device comprising:

a fluid-tight housing having a fluid receiving chamber, with ports extending through the wall of said housing into said chamber providing means for securing the ends of said conduit of said system so as to allow fluid under pressure to flow through it while leaving said chamber unobstructed within said housing;

an elongated resiliently yieldable, shock-absorbing member in the form of a solid piece of molded elastomeric material of approximately 80 shores hardness and having an end portion with a face forming a sidewall of said fluid receiving chamber, means for sealing around said end portion and an axially tapered body portion with a coating of graphite powder; and an extended portion on said housing providing an enclosed fluid-tight cavity for said tapered body portion of said resiliently yieldable member, said cavity being large enough to provide space surrounding said tapered body portion so that it can accommodate distortion thereof when increased fluid pressure occurs in said chamber against said face of said end portion.

2. The pressure equalizing and shock-absorbing device as described in claim 1 wherein said face of said end portion on said resiliently yieldable member is slightly concave.

3. The pressure equalizing and shock-absorbing device as described in claim 1 wherein said fluid tight housing is comprised of a main housing member and a cup-like end cap member secured thereto, said main housing member having a cylindrical bore forming said fluid receiving chamber, said end portion of said resiliently yieldable member fitted snugly with one end of said chamber, said means for sealing said yieldable member comprising a radial collar retained by said end cap member against said main housing member, said cavity of said end cap member being cylindrical and surrounding said tapered body portion of said yieldable member.

4. The pressure equalizing and shock-absorbing device as described in claim 1 wherein said resiliently yieldable member has a cylindrical end portion attached to said sealing means which is a radially extending collar and which is also integral with said tapered body portion which has a conical shape with an axially extending knob at its small end retained by a matching recess in said housing.

* * * * *